United States Patent [19]

Board et al.

[11] Patent Number: 5,473,724

[45] Date of Patent: Dec. 5, 1995

[54] HOUSING FOR OPTICAL FIBRES

[75] Inventors: Bruce L. Board, Vermont; Brian Murrihy; Edward Wilson, both of Frankston, all of Australia

[73] Assignee: Fibernet Research Pty. Ltd., Australia

[21] Appl. No.: 295,920

[22] PCT Filed: Mar. 24, 1993

[86] PCT No.: PCT/AU93/00119

§ 371 Date: Sep. 15, 1994

§ 102(e) Date: Sep. 15, 1994

[87] PCT Pub. No.: WO93/19392

PCT Pub. Date: Sep. 30, 1993

[30] Foreign Application Priority Data

Mar. 25, 1992 [AU] Australia .................. PL1503

[51] Int. Cl.⁶ .................... G02B 6/44
[52] U.S. Cl. .................... 385/135; 385/136
[58] Field of Search .................... 385/53, 134, 135, 385/136, 137, 147, 95, 96, 99

[56] References Cited

U.S. PATENT DOCUMENTS

| | | | |
|---|---|---|---|
| 4,754,876 | 7/1988 | Noon et al. | 385/135 X |
| 4,820,007 | 4/1989 | Ross et al. | 385/135 |
| 5,046,811 | 9/1991 | Jung et al. | 385/135 X |
| 5,093,885 | 3/1992 | Anton | 385/134 |
| 5,115,489 | 5/1992 | Norris | 385/135 |
| 5,323,478 | 6/1994 | Milanowski et al. | 385/135 |
| 5,375,185 | 12/1994 | Hermsen et al. | 385/135 |

FOREIGN PATENT DOCUMENTS

| | | | |
|---|---|---|---|
| 0055231 | 6/1982 | European Pat. Off. | |
| 0204581 | 12/1986 | European Pat. Off. | |
| 0333316 | 9/1989 | European Pat. Off. | |
| 59-15210 | 1/1984 | Japan | 385/135 |
| 90/15351 | 12/1990 | WIPO | |
| 91/05281 | 4/1991 | WIPO | |

Primary Examiner—Rodney B. Bovernick
Assistant Examiner—Hemang Sanghavi
Attorney, Agent, or Firm—Larson and Taylor

[57] ABSTRACT

A housing for one or more splices of optical fiber includes at least portions of each fiber in the region of the splices. The housing includes a tray portion having a fiber receiving surface and peripheral wall means extending from the surface and retaining means associated with said tray portion. The tray portion also includes anchor providing means at ports of entry and exit of each optical fiber into and out of the housing. The retaining means is movable between a first position in which at least portions of each optical fiber are retained adjacent the tray portion and a second position in which the splices and portions of each optical fiber are placed in the housing. When the splices and portions of each optical fiber are placed in the housing and the portions are anchored at the anchor providing means, the tray portion and the retaining means in the first position cooperate with the anchor means to substantially isolate each splice from mechanical disturbances along each optical fiber upstream and downstream of the entry and exit ports, respectively.

12 Claims, 2 Drawing Sheets

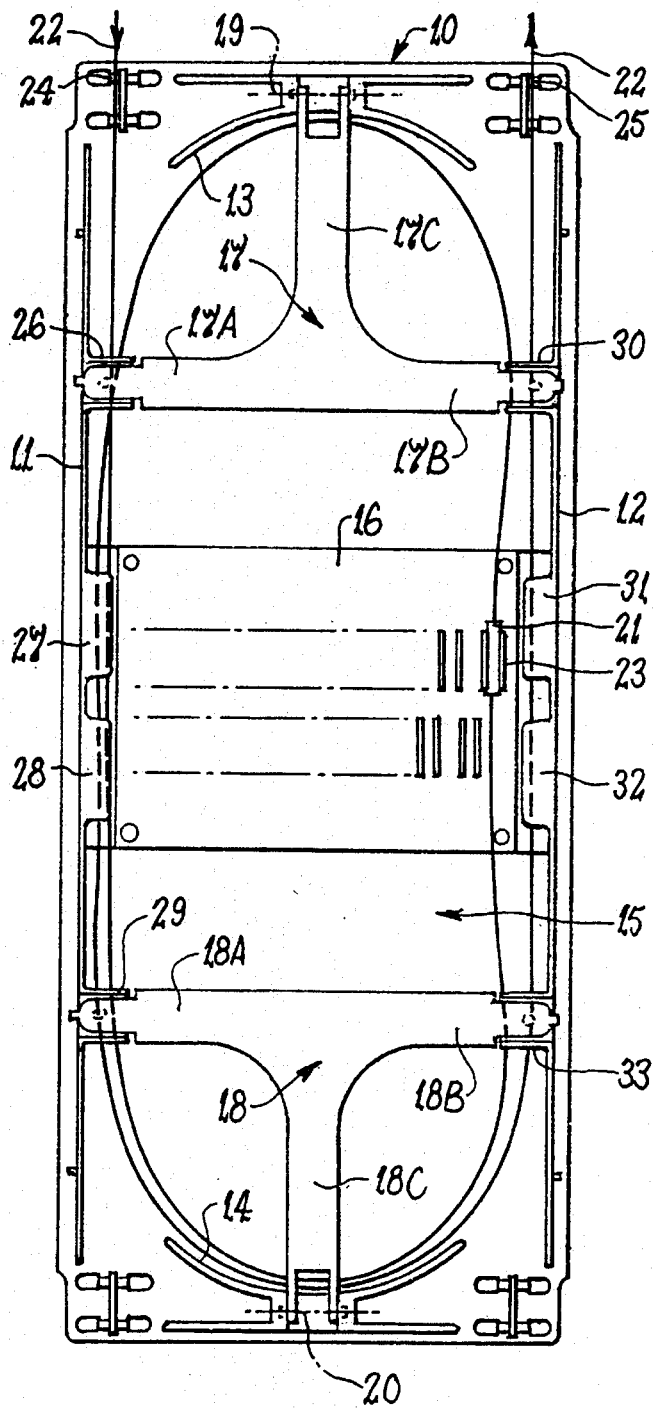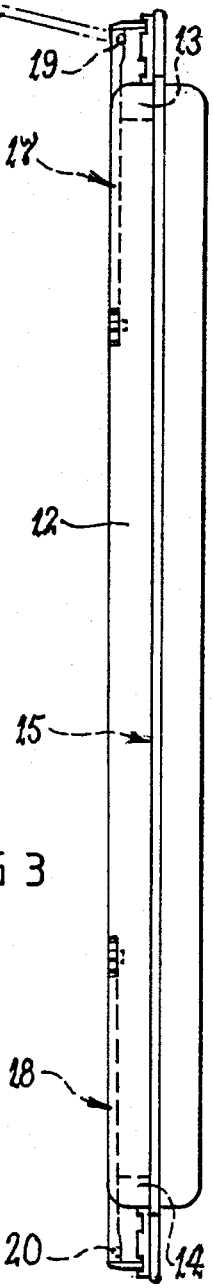
FIG 2
FIG 3

HOUSING FOR OPTICAL FIBRES

FIELD OF THE INVENTION

The present invention relates to a housing for optical fibres and/or cables comprising optical fibres. More specifically the present invention relates to a housing for storing spliced optical fibres/cables including excess or slack fibres/cables in the vicinity of splices therein.

BACKGROUND OF THE INVENTION

Use of optical fibres for signal transmission is well known in the communications industry. Whilst optical fibres provide significant advantages over conventional signal paths, unique problems are associated with management of optical fibre based communication systems. For example optical fibres having extremely small diameters are relatively delicate and require careful handling. This is particularly the case where optical fibres or cables are to be joined or spliced together. The region of the splice or joint is especially delicate and needs to be secured against mechanical disturbances such as shock, stress, strain and the like. An optical cable joint may contain a large number of individual splices each of which needs to be secured against mechanical disturbances of the kind noted above.

SUMMARY OF THE INVENTION

The present invention contemplates a housing for arranging and storing excess or slack fibres in the region of or adjacent a splice or joint. The housing may be suitable for use in termination cabinet facilities or in underground or overhead cable joints such as the SIEMENS UC and UCN closure range, the latter being also sold under the AMP brand. The housing of the present invention may be compatible with loose tube, slotted core, ribbon and cord type cable designs. The housing may allow adequate bending radii for stored cables/fibres. For example, the housing may allow adequate bending radii and protection necessary at least for fibres suitable for 850, 1300 and 1550 nm optical transmission.

An industry standard splice holder may be provided with the housing. The splice holder may have any suitable number of splice positions eg. twenty-four. The splice holder may be suitable for receiving various splice protector types including heatshrink and adhesive fusion splice protectors from Sumitomo Electric and Northern Telecom, and mechanical splices such as, inter alia, GTE elastomeric and 3M Fiberlok splices.

The housing comprises a tray portion. The tray portion may include a substantially flat working area. The tray portion may include side and end walls. The tray portion may be adapted to receive a standard splice holder intermediate its end walls. Preferable the splice holder is received substantially in the middle of the working area of the tray portion. The tray portion may be formed from any suitable material such as ABS plastics and in any suitable manner such as by means of injection molding. The splice holder may be formed from any suitable material eg. modified ABS and in any suitable manner eg. injection molding. The splice holder may be attached to the tray portion in any suitable manner and by any suitable means.

The tray portion may store excess or slack optical fiber(s) adjacent a splice(s) or joint(s) in the optical fibre(s). The slack or excess fibre(s) may be held in the tray such that optical fibres entering the housing are substantially mechanically isolated from the splice(s) or joint(s). In one form the tray portion may be adapted to store say 1 to 2 m of slack or excess fibre per splice. The filament of the or each optical fibre upstream from the splice may be anchored to the tray portion at one or more entry ports in any suitable manner such as by means of a cable tie or ties. Each splice may be located in the splice holder. The portion of the filament of each optical fibre intermediate the entry port and splice may be laid substantially loose in the tray and may include at least one bend or turn in the or each filament. The filament of the or each optical fibre down stream from the splice may be anchored to the tray portion at one or more exit ports in any suitable manner such as by means of a cable tie or ties. The portion of the filament of the or each optical fibre intermediate the splice and exit port also may be laid substantially loose in the tray and may include at least one bend or turn in the or each filament. The tray should be dimensioned such that the minimum bend radius for the filament of the or each optical fibre is not breached. In one form the width of the working area of the tray may be substantially 11 cm providing a maximum bend radius for the filament of each optical fibre of about 5.5 cm.

At least some end walls of the tray portion may be curved to accommodate a bend or bends in the filament of the or each optical fibre. The or each curved end wall may exhibit a radius of curvature which is not less than the minimum bend radius for the filament of the or each optical fibre.

The housing includes fibre/cable retaining means. The retaining means may be adapted to retain slack or loose fibres against or adjacent the working area of the tray portion. The retaining means may include one of more retaining members. The or each retaining member may be movable between a first position in which it substantially overlies and/or retains slack or loose fibres adjacent the working area of the tray portion and a second position away from the working area of the tray. The or each retaining member may be movably or removably attached to the tray portion. The or each retaining member may be movably attached to the tray portion in any suitable manner such as by being pivotably attached to an end wall or walls of the tray portion. The or each retaining member may be removably attached to the tray portion in any suitable manner eg. by being removably attached to an end wall or end walls of the tray portion or one or more posts projecting from the working area of the tray portion. The or each retaining member may be removably attached to the tray portion via a sliding, snap or interference fit or clip in connection.

The or each retaining member may include at least first and second parts adapted to retain slack or loose fibres adjacent side walls of the tray portion. The or each retaining member may include a third part adapted to retain slack or loose fibres adjacent an end wall the tray portion.

The first and second parts may comprise respective opposing ends of a lateral element spanning substantially the width of the working area. The third part may comprise a longitudinal element extending between the lateral element and an end wall of the tray portion. The longitudinal element may be connected to the end wall by pivotable means or it may be connected thereto by means of an interference or snap fit etc.

In one form the or each retaining member may be in the form of a T with the top of the T forming the lateral element and the leg of the T forming the longitudinal element. The longitudinal element may be formed integrally with the lateral element or it may be formed separately and attached thereto in any suitable manner. The free end of the longitudinal element may be pivotably or removably attached to an end wall of the tray portion. The or each retaining member may be formed of any suitable material such as an engineering plastics material, and in any suitable manner such as by means of injection molding.

When a retaining member is in the first position ie. overlying and/or retaining slack or loose fibres adjacent the working area of the tray portion, the lateral element thereof may be removably attached to respective side walls of the tray portion. The side walls preferably include respective ledge portions for receiving free ends of the lateral element of the retaining member. The ledge portions may be spaced from the working surface of the tray portion such that optical cables/fibres may pass between the ledge portions and the working surface. The free ends of the lateral element may be removably attached to the ledge portions in any suitable manner such as by way of an interference or snap fit or the like.

When fibres/cables are to be placed in the housing the or each retaining member may be moved to the second position away from the working area of the tray. This may allow substantially unhindered access to the working surface of the tray. In the second position of the retaining members the ledge portions may assist assembly/placement of fibres in the tray portion. When assembly/placement of fibres is completed, the retaining members may be moved to the first position to retain the fibres substantially against the working surface.

The housing may include a cover to protect the fibres and splices. The cover may be adapted to fit over and be attached to the tray portion in any suitable manner eg. by means of clipping or snap fitting over side walls of the tray portion.

According to the present invention there is provided a housing for one or more splices of optical fibre including at least portions of the or each fibre in the region of said splice(s), said housing comprising:

a tray portion having a fibre receiving surface and peripheral wall means extending from said surface, said tray portion having means for providing anchor means at ports of entry/exit of the or each optical fibre into/out of said housing;

retaining means associated with said tray portion, said retaining means being movable between a first position in which at least said portions of the or each optical fibre are retained adjacent said tray portion and a second position in which said splice(s) and said portions of the or each optical fibre are placed in said housing;

wherein when said splice(s) and said portions of the or each optical fibre are placed in said housing and said portions are anchored at said anchor providing means, said tray portion and said retaining means in said first position cooperate with said anchor means to substantially isolate the or each splice from mechanical disturbances along the or each optical fibre upstream and downstream of said entry and exit ports respectively.

BRIEF DESCRIPTION OF THE DRAWINGS

A preferred embodiment of the present invention will now be described with reference to the accompanying drawings wherein:

FIG. 2 shows a housing as in FIG. 1 with a spliced optical fibre fitted therein;

FIG. 3 shows a cross-sectional view on III—III in FIG. 1;

FIG. 4 shows an end view on IV—IV in FIG. 1; and

FIG. 5 shows a cross-sectional view on V—V in FIG. 1.

DESCRIPTION OF THE PREFERRED EMBODIMENTS

Figure 1:
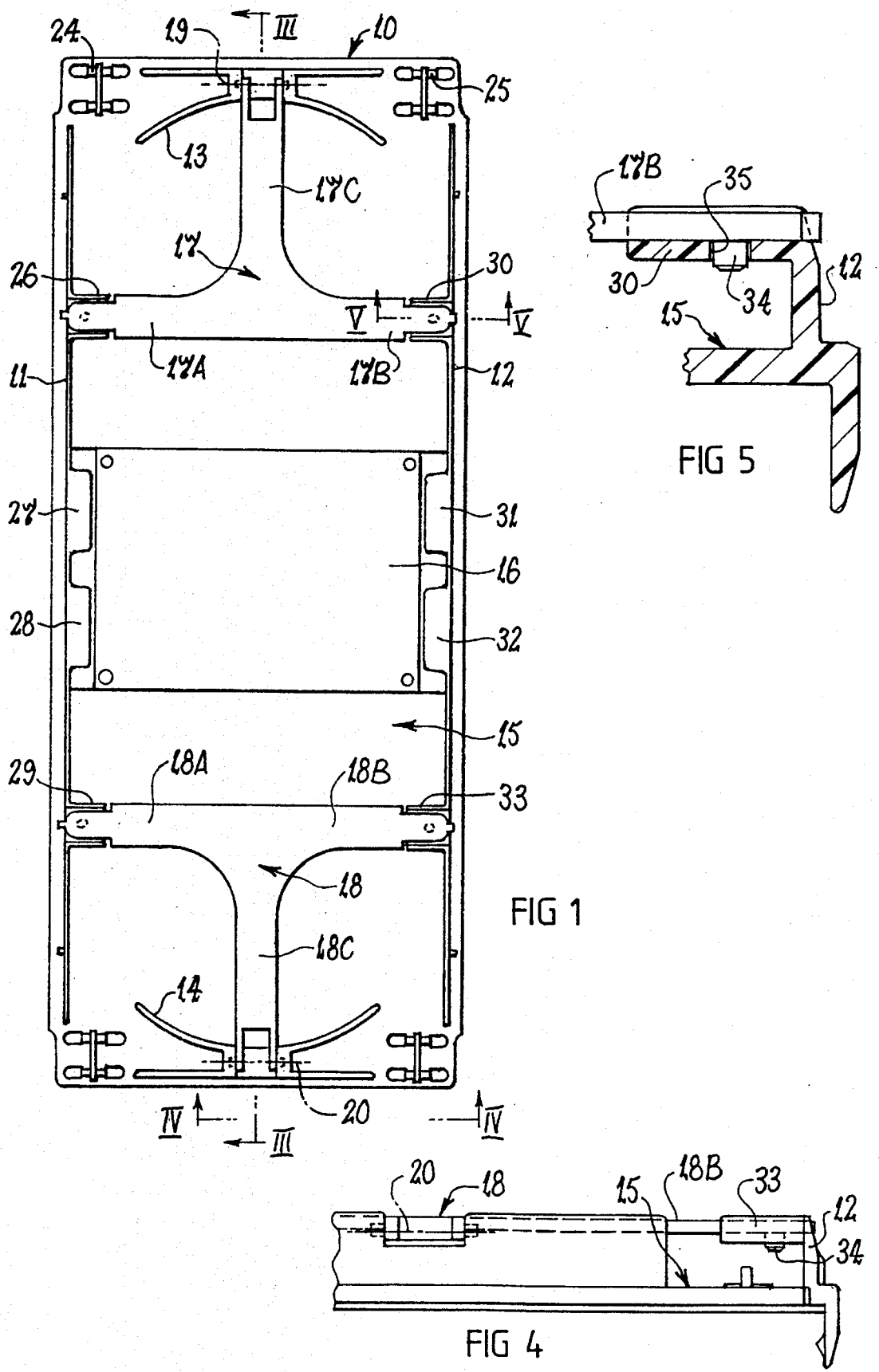
FIG. 1 shows a plan view of a housing for optical fibres according to the present invention.

Referring to FIG. 1 the housing for optical fibres includes a tray 10. Tray 10 includes side walls 11, 12, end walls 13, 14 and an intermediate working surface 15. An industry standard splice holder 16 is mounted on working surface 15. The housing includes T-shaped retaining members 17, 18 at opposite ends thereof. The free ends of the legs of the T shaped retaining members 17, 18 are hingedly attached to tray 10 on pivot axes 19, 20 respectively behind curved end walls 13, 14 of tray 10.

Referring to FIGS. 2–3, when spliced optical fibres are to be placed into the housing, retaining members 17, 18 are moved from their first positions shown in FIG. 1, in which members 17, 18 overlie working surface 15, to their second positions, away from the working surface 15, exemplified in broken outline in FIG. 3 with reference to retaining member 17. In the second position of retaining member 17 shown in FIG. 3, relatively unhindered access to working surface 15 is provided for laying of optical fibres thereon. Splice 21 associated with optical fibre 22 is placed into a receptor 23 in splice holder 16.

The portion of the filament of optical fibre 22 upstream from splice 21 is anchored at entry port 24 of tray 10 via a cable tie (not shown). The portion of the filament of optical fibre 22 intermediate entry port 24 and splice 21 is laid (anti-clockwise) along side wall 11 then along curved end wall 14 then partly adjacent side wall 12. The radius of curvature of end wall 14 should not be less than the minimum bending radius for optical fibre 22.

The portion of the filament of optical fibre 22 downstream from splice 21 is anchored at exit port 25 of tray 10 via a cable tie (not shown). The portion of optical fibre 22 intermediate splice 21 and exit port 25 is laid (anti-clockwise) first partly adjacent side wall 12, then along curved end wall 13, then along side wall 11, then along curved end wall 14 and finally along side wall 12. As with end wall 14, the radius of curvature of end wall 13 also should not be less than the minimum bending radius for optical fibre 22. Further optical fibres may be laid on or adjacent working surface 15 in a similar manner.

After laying of all optical fibres has been completed retaining members 17, 18 are moved to their first positions shown in FIGS. 1–2 ie. overlying working surface 15. With retaining members 17, 18 in the first positions, the optical fibres (22) are neatly retained between the working surface 15 and retaining members 17, 18. A rigid cover panel (not shown) may be fitted over tray 10 to further protect the optical fibres and splices. Tray 10 may be designed to stack on top of another tray of the same or a similar configuration and in the latter case the upper tray (at least) may have incorporated with its underneath surface a cover for the lower tray.

T shaped retaining member 17 includes first and second parts 17A, 17B adjacent respective side walls 11, 12 and overlying working surface 15, and a third part 17C adjacent curved end wall 13 and overlying working surface 15. T-shaped retaining member 18 includes first and second parts 18A, 18B adjacent respective side walls 11, 12 and overlying working surface 15, and a third part 18C adjacent curved end wall 14 and overlying working surface 15. Parts 17A, 17B, 17C of retaining member 17 are adapted to retain at least a portion of optical fibres laid against or adjacent side wall 11, side wall 12 and curved end wall 13 respectively. Parts 18A, 18B, 18C of retaining member 18 are adapted to retain at least a portion of optical fibres laid against or adjacent side wall 11, side wall 12 and curved end wall 14 respectively.

In the embodiment shown in the drawings, side walls 11, 12 of tray 10 include ledge extensions or wings 26–33. Wings 26–33 extend parallel to working surface 15 and are spaced therefrom to allow optical fibres to pass therebetween. Wings 26–33 assist assembly/placement of the optical fibres (22) in the tray 10 because they serve to maintain (at least) the optical fibres (22) laid against sidewalls 11, 12 when retaining members 17, 18 are in the second or open positions away from working surface 15.

In the embodiment shown in the drawings, the free ends of parts 17A, 17B of retaining member 17 are attached to wings 26, 30 respectively. The free ends of parts 18A, 18B of retaining member 18 are similarly attached to wings 29, 33 respectively. The manner of attaching the free end of part 17B of retaining member 17 to wing extension 30 is shown in FIG. 5 and includes fastening pin 34 projecting from the free end of part 17B, and aperture 35 in wing 30 for receiving pin 34. A similar attachment mechanism is employed for attaching the free ends of parts 17A, 18A and 18B to wings 26, 29 and 33 respectively.

It is to be understood that various alterations, modifications and/or additions may be introduced into the constructions and arrangements of parts previously described without departing from the spirit or ambit of the invention.

We claim:

1. A housing for at least one splice of optical fibre including at least portions of the fibre in the region of said splice, said housing comprising;

a tray portion having a fibre receiving surface and peripheral wall means extending from said surface, said tray portion having anchor providing means at ports of entry and exit of the optical fibre into and out of said housing;

retaining means associated with said tray portion, said retaining means being movable between a first position in which said portions of the optical fibre are retained adjacent said tray portion and a second position in which said splice and said portions of the optical fibre are placed in said housing;

wherein when said splice and said portions of the optical fibre are placed in said housing and said portions are anchored at said anchor providing means, said tray portion and said retaining means in said first position cooperate with said anchor means to substantially isolate said splice from mechanical disturbances occurring along the optical fibre upstream and downstream of said entry and exit ports respectively.

2. A housing according to claim 1 wherein said fibre receiving surface includes means for receiving a splice holder intermediate said wall means, said holder having at least one receptor for said one splice.

3. A housing according to claim 1 wherein said wall means includes curved end walls, each end wall having a radius of curvature not less than a minimum bend radius for the optical fibre.

4. A housing according to claim 1 wherein said tray portion is adapted to receive at least one bend in the portion of the optical fibre intermediate said input port and the splice.

5. A housing according to claim 1 wherein said tray portion is adapted to receive at least one bend in the portion of the optical fibre intermediate the splice and said output port.

6. A housing according to claim 1 wherein said retaining means comprises parts adapted to overlay said surface adjacent at least some of said wall means.

7. A housing according to claim 6 wherein said retaining means comprises at least one lateral element spanning substantially the width of said receiving surface.

8. A housing according to claim 7 wherein said retaining means comprises a longitudinal element extending between said lateral element and an end wall of said tray portion.

9. A housing according to claim 1 wherein said wall means includes side walls having ledge portions extending from said side walls and spaced from and parallel to said fibre receiving surface.

10. A housing according to claim 1 wherein said retaining means is pivotably attached to said wall means.

11. A housing according to claim 1 including a cover for said tray portion adapted to clip over said wall means.

12. A housing according to claim 11 wherein said cover is incorporated underneath said tray portion.

* * * * *